United States Patent
Otero et al.

(10) Patent No.: US 10,198,423 B2
(45) Date of Patent: *Feb. 5, 2019

(54) SUGGESTING A SET OF OPERATIONS APPLICABLE TO A SELECTED RANGE OF DATA IN A SPREADSHEET

(71) Applicant: Microsoft Technology Licensing, LLC, Redmond, WA (US)

(72) Inventors: Carlos Augusto Otero, Seattle, WA (US); John Campbell, Renton, WA (US); Uhl Albert, Kirkland, WA (US); Pablo Rochat, San Francisco, CA (US)

(73) Assignee: Microsoft Technolgy Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/346,417

(22) Filed: Nov. 8, 2016

(65) Prior Publication Data

US 2017/0124058 A1  May 4, 2017

Related U.S. Application Data

(63) Continuation of application No. 13/918,897, filed on Jun. 14, 2013, now Pat. No. 9,489,368.

(51) Int. Cl.
*G06F 17/24* (2006.01)
*G06F 3/0482* (2013.01)
*G06F 3/0484* (2013.01)

(52) U.S. Cl.
CPC .......... *G06F 17/246* (2013.01); *G06F 3/0482* (2013.01); *G06F 3/04847* (2013.01)

(58) Field of Classification Search
None
See application file for complete search history.

(56) References Cited

U.S. PATENT DOCUMENTS

| 5,461,708 | A | | 10/1995 | Kahn |
| 5,510,980 | A | * | 4/1996 | Peters ................ G06F 17/246 705/32 |
| 5,890,174 | A | * | 3/1999 | Khanna ............... G06F 17/246 715/209 |
| 5,987,481 | A | | 11/1999 | Michelman et al. |

(Continued)

FOREIGN PATENT DOCUMENTS

| CN | 102629180 A | 8/2012 |
| CN | 102945227 A | 2/2013 |

(Continued)

OTHER PUBLICATIONS

"Office Action Issued in European Patent Application No. 14739999.2", dated May 9, 2017, 14 Pages.

(Continued)

*Primary Examiner* — Asher D Kells

(57) ABSTRACT

A smart selection engine is provided. The smart selection engine may run in the context of a spreadsheet application on any device, service, or general endpoint capable of running the spreadsheet application. The smart selection engine reduces the cognitive load and complexity for performing spreadsheet operations by clearly presenting the user with easy to use and understand options that are big, simple, and lend themselves nicely to natural user interfaces, touch enabled devices, and devices with small displays as well as with graphical user interfaces, larger displays, and traditional input devices. By making contextually based suggestions, the smart selection engine reduces or eliminates the need for the user to be aware of the available operations or how to perform the operations. Further, the smart selection engine improves the consistency and efficiency of working with a spreadsheet.

17 Claims, 11 Drawing Sheets

(56) References Cited

U.S. PATENT DOCUMENTS

| | | | |
|---|---|---|---|
| 6,055,548 A * | 4/2000 | Comer | G06F 17/246 715/212 |
| 7,451,397 B2 | 11/2008 | Weber et al. | |
| 8,386,916 B2 | 2/2013 | Le Brazidec et al. | |
| 8,407,579 B2 | 3/2013 | Raja et al. | |
| 9,489,368 B2 | 11/2016 | Otero et al. | |
| 2003/0033329 A1 | 2/2003 | Bergman et al. | |
| 2006/0036945 A1 | 2/2006 | Radtke et al. | |
| 2006/0069696 A1 | 3/2006 | Becker et al. | |
| 2006/0129932 A1* | 6/2006 | Weber | G06F 17/246 715/705 |
| 2009/0044089 A1* | 2/2009 | Gur | G06F 17/246 715/212 |
| 2010/0050079 A1 | 2/2010 | Thompson | |
| 2013/0067306 A1 | 3/2013 | Bhargav et al. | |
| 2013/0104020 A1 | 4/2013 | Patterson et al. | |
| 2013/0145244 A1 | 6/2013 | Rothschiller et al. | |

FOREIGN PATENT DOCUMENTS

| | | |
|---|---|---|
| CN | 102981702 A | 3/2013 |
| CN | 102982016 A | 3/2013 |

OTHER PUBLICATIONS

"First Office Action and Search Report Issued in Chinese Patent Application No. 201480033789.9", dated Apr. 36, 2017, 12 Pages.

"Second Written Opinion Issued in PCT Application No. PCT/US2014/040207", dated May 20, 2015, 10 Pages.

Abraham, R. et al., "Inferring templates from spreadsheets," Proceedings of the 28th International Conference on Software Engineering, Shanghai, China, pp. 182-191 (May 20-28, 2006).

European Official Communication in Application 14739999.2, dated Jan. 21, 2016, 2 pgs.

PCT International Search Report and Written Opinion for PCT/US2014/040207 dated Sep. 17, 2014, 16 pgs.

U.S. Appl. No. 13/918,897, Amendment after Allowance filed Sep. 30, 2016, 7 pgs.

U.S. Appl. No. 13/918,897, Amendment and Response filed Dec. 18, 2015, 11 pgs.

U.S. Appl. No. 13/918,897, Amendment and Response filed Jun. 24, 2016, 10 pgs.

U.S. Appl. No. 13/918,897, Notice of Allowance dated Jun. 30, 2016, 7 pgs.

U.S. Appl. No. 13/918,897, Office Action dated Feb. 2, 2016, 12 pgs.

U.S. Appl. No. 13/918,897, Office Action dated Sep. 16, 2015, 16 pgs.

U.S. Appl. No. 13/918,897, USPTO Response dated Oct. 11, 2016, 2 pgs.

Zoho Sheet—Features, Published on: Aug. 2, 2012, Available at: hllps://sheet.zoho.com/features, 27 pgs.

Second Office Action Issued in Chinese Patent Application No. 201480033789.9, dated Nov. 8, 2017, 10 Pages.

"Notice of Allowance Issued in Chinese Patent Application No. 201480033789.9", dated Jul. 26, 2018, 9 pages.

* cited by examiner

SUGGESTING A SET OF OPERATIONS APPLICABLE TO A SELECTED RANGE OF DATA IN A SPREADSHEET

RELATED APPLICATION

This application claims priority to and is a continuation of U.S. patent application Ser. No. 13/918,897, filed Jun. 14, 2013, assigned U.S. Pat. No. 9,489,368, and titled "SUGGESTING A SET OF OPERATIONS APPLICABLE TO A SELECTED RANGE OF DATA IN A SPREADSHEET," which is incorporated by reference herein.

BACKGROUND

Spreadsheets are valuable tools for communicating data, status, decisions, and other information. The basics of entering data in a spreadsheet are generally easily managed by most spreadsheet users, but remembering and applying spreadsheet operations (e.g., creating charts, adding multi-parameter functions, modifying chart series, or creating array functions) is generally a much more difficult task. Spreadsheets have custom syntax and constructs that are often foreign, arcane, and only understandable by advanced users. Often the user must read the help files for all but the simplest spreadsheet operations and/or seek out a third party tutorial or other explanation on how to perform the spreadsheet operation. A way of automatically and contextually identifying and suggesting spreadsheet elements for use in a spreadsheet operation to a user would be an improvement providing a technical advantage over the current state of the art because it would reduce the knowledge required and make it easier for a user to create and edit spreadsheets.

The problems with remembering and applying spreadsheet operations are compounded when trying to use a spreadsheet on devices with smaller screens such as tablets and smartphones and by the trend of natural user interfaces (NUIs) replacing graphical user interfaces (GUI) on touch enabled devices. The smaller screens limit the amount of information that is visible at one time making it difficult for the user to display help screens and tutorials at the same time as the spreadsheet. Instead, the user is forced to read information from the help screen or tutorial, switch back to the spreadsheet, and then remember and apply the information to perform the spreadsheet operation. For simpler spreadsheet operations, this process is tedious and inefficient. For more complex spreadsheet operations, this process becomes unwieldy often to the point of becoming useless. The problems introduced by devices with smaller screens are exacerbated by the fact that most such devices lack a physical keyboard requiring even more precious display space to be occupied by a virtual keyboard in order to enter information necessary to perform the spreadsheet operation.

NUIs tend to eschew the use of traditional menus found in GUIs interfaces and seek to minimize the need for keyboard input. However, performing spreadsheet operations is generally designed around traditional menu concepts and the use of keyboards and other traditional input devices (e.g., mice). For example, a GUI typically includes a dedicated function entry area where the user types the name of a spreadsheet function in or pulls down a long list of all available functions or categorized functions and makes a selection. These GUI selection techniques are not conducive to a good NUI experience and not practical on most touch enabled devices. A way of automatically and contextually allowing a user to perform a spreadsheet operation by directly interact with spreadsheet elements would be an improvement providing a technical advantage over the current state of the art because it would make it easier and more efficient for a user to create and edit spreadsheets, especially when using NUIs and on devices having smaller displays.

It is with respect to these and other considerations that the present invention has been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments described in the present disclosure provide for a smart selection engine that may run in the context of a spreadsheet application on any device, service, or general endpoint capable of running the spreadsheet application. The smart selection engine reduces the cognitive load and complexity for performing spreadsheet operations by clearly presenting the user with easy to use and understand options to complete a spreadsheet operation.

The smart selection engine contextually suggests areas in the user interface for the user to interact with, perform operations, or add content to the spreadsheet. The smart selection engine may make suggestions based on the layout and/or the content analysis. The smart selection engine may also make suggestions based on user initiated actions. The manner in which the suggestions are displayed in the user interface may depend upon the type of suggestion. For example, viable spreadsheet operations (e.g., formulas or functions) may be displayed as buttons in a guided input area. Contextual analysis of the data may involve detecting the layout or content of the data. Based on contextual analysis, different types of data may be grouped separately.

Next, the smart selection engine receives an input indicating which suggested operation the user wants to apply. Once a spreadsheet operation has been selected, the smart selection engine displays the possible results of the operation in the spreadsheet but does not make any actual changes to the spreadsheet. In various embodiments, the smart selection engine makes range suggestions based on the type of input expected for the selected operation. In the case of a simple spreadsheet function, the smart selection engine may display suggested results as highlighted results of the formula for the selected operation applied to various ranges of data in the spreadsheet as selectable objects positioned at places around the data that make sense for consideration by the user. In the case of a complex spreadsheet function or a user initiated action where additional user input is desired (or necessary), the guided input area may be replaced with additional information, selection controls, and/or fields to assist the user with completing the operation.

Subsequently, the smart selection engine receives an input indicating which result or results the user wants to keep and commit to the spreadsheet. Once a selection has been made, the smart selection engine commits the suggested result to the spreadsheet.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 7 shows examples of some of the contextual analysis performed by one embodiment of the smart selection engine;

FIGS. 8-11 illustrates one embodiment of the smart selection engine working with a complex function;

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Embodiments of a smart selection engine are described herein and illustrated in the accompanying figures. The smart selection engine may run in the context of a spreadsheet application on any device, service, or general endpoint capable of running the spreadsheet application. The smart selection engine reduces the cognitive load and complexity for performing spreadsheet operations by clearly presenting the user with easy to use and understand options that are big, simple, and lend themselves nicely to natural user interfaces (NUIs), touch enabled devices, and devices with small displays as well as with graphical user interfaces (GUIs), larger displays, and traditional input devices (e.g., a mouse, keyboard, or camera). By making contextually based suggestions, the smart selection engine reduces or eliminates the need for the user to be aware of the available operations or how to perform the operations. Further, the smart selection engine improves the consistency and efficiency of working with a spreadsheet.

Figure 1:
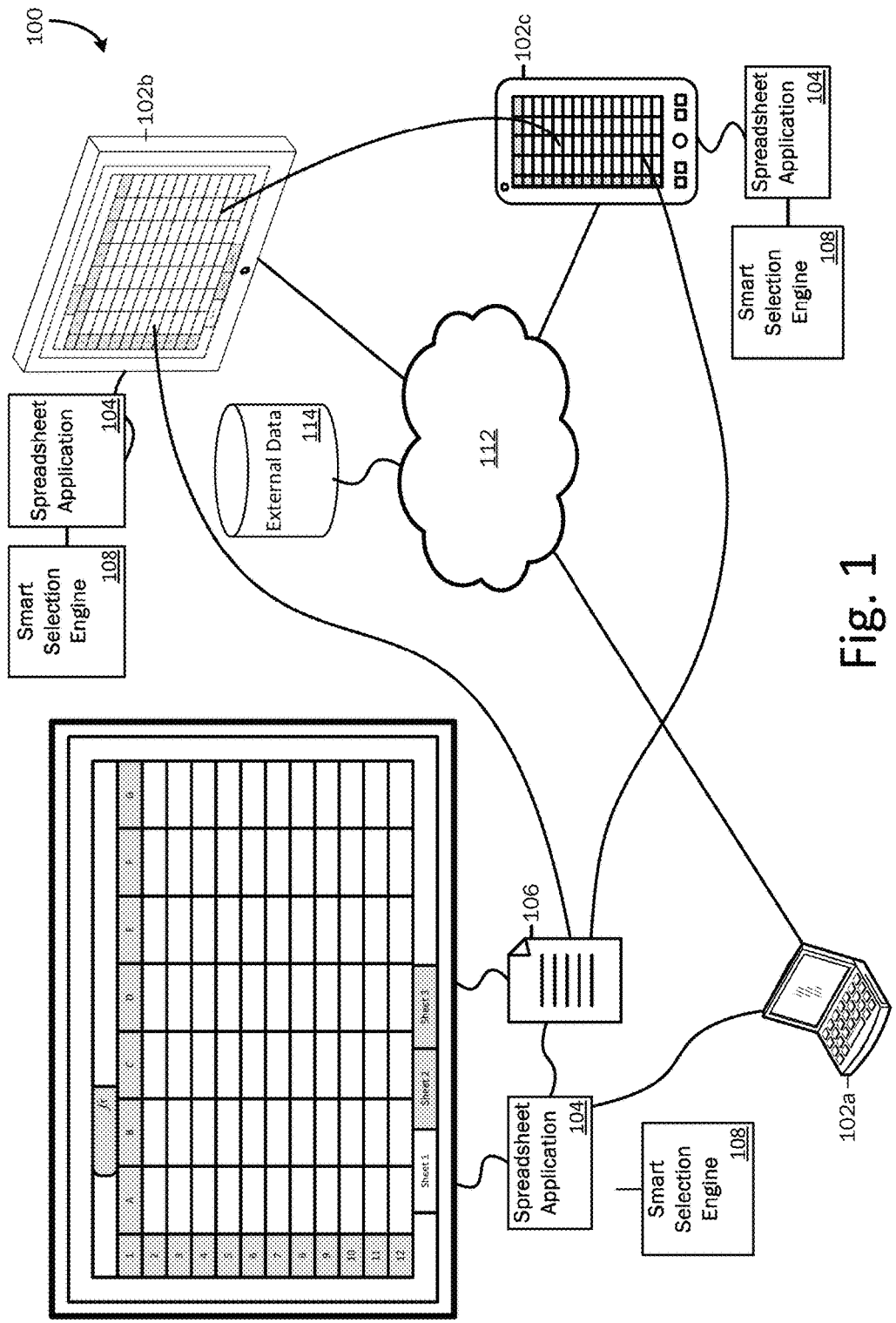
FIG. 1 illustrates one embodiment of a system including the smart selection engine.

FIG. 1 illustrates one embodiment of a system including the smart selection engine. The system 100 includes one or more computing devices such as personal computer (e.g., a desktop or laptop computer) 102a, a tablet computer 102b, and a smart phone 102c. Each of the computing devices runs a spreadsheet application 104 for displaying and editing a spreadsheet 106. Each of the computing devices also runs a smart selection engine 108 that may be integrated into the spreadsheet application 104 or run as a separate application interoperating with the spreadsheet application 104. The computing devices are connected to a network 112 (e.g., an intranet or Internet). The illustrated embodiment also shows an external data source 114 that may be linked to and provide data to the spreadsheet 106.

Figure 2:
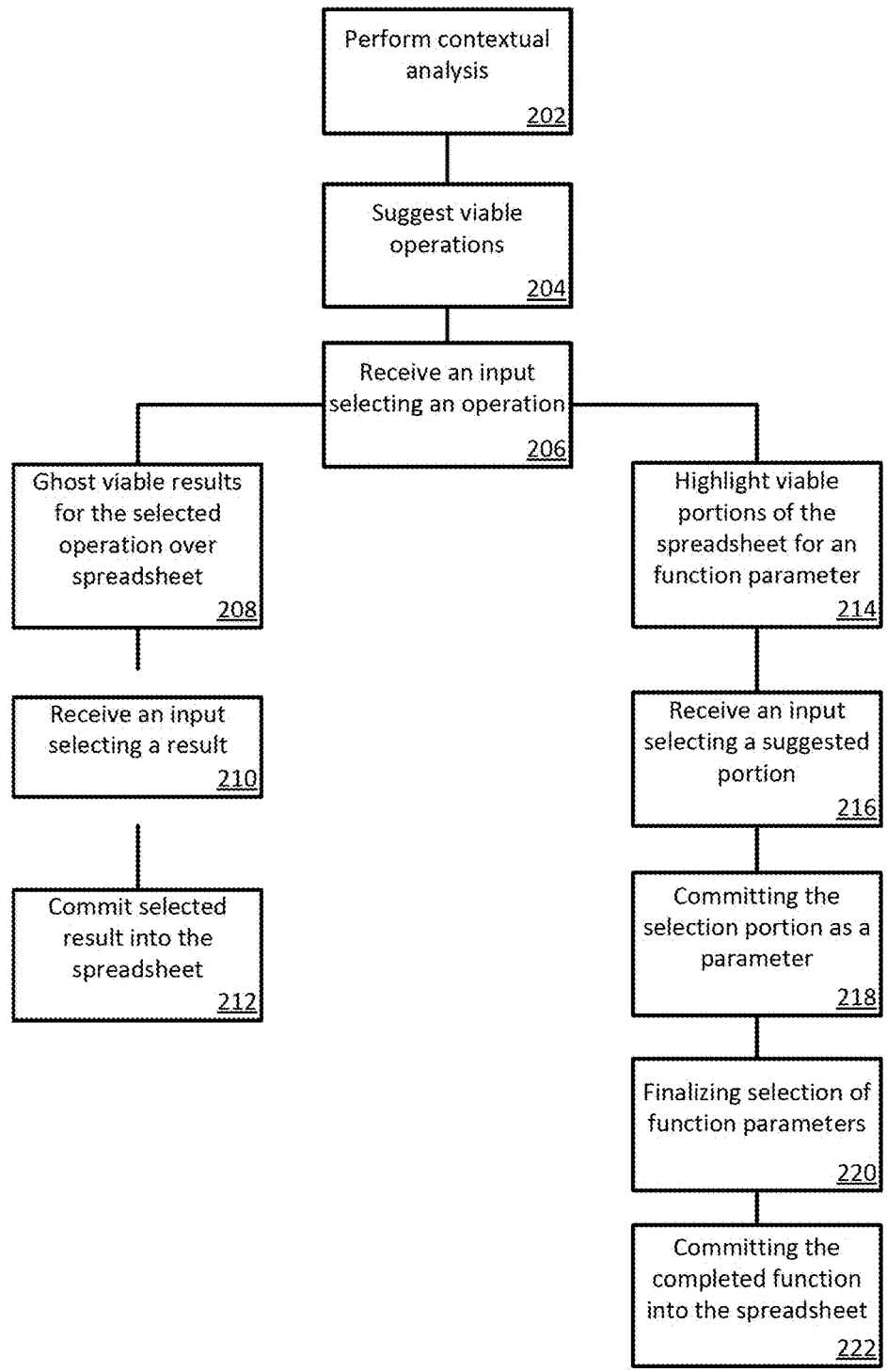
FIG. 2 illustrates one embodiment of a smart selection method performed by the smart selection engine.

FIG. 2 is a flow chart of one embodiment of the smart selection method 200 employed by the smart selection engine 108. The smart selection engine 108 works with data in or linked to a spreadsheet. The smart selection engine 108 contextually suggests areas in the user interface for the user to interact with, perform operations, or add content to the spreadsheet. The smart selection engine 108 may make suggestions based on the layout and/or the content analysis 202. In various embodiments, the smart selection engine 108 provides a set of viable operations 204 based on the contextual analysis. The smart selection engine 108 receives an input triggering suggestions corresponding to a selected operation. In some embodiments, the input is the selection of a suggested operation. In other embodiments, the input is a user initiated action (e.g., the user launches a command to create a chart or table). The types of suggested operations include, but are not limited to, adding or editing simple spreadsheet functions (e.g., allowing easy selection of cells/ranges to a function requiring a single parameter), adding or editing complex spreadsheet functions (e.g., allowing easy selection of cells/ranges to a function requiring a multiple parameters), inserting missing data (e.g., identifying blank cells within a range), formatting data (e.g., applying appropriate formatting to columns with labels such as "date" or "price"), and creating or editing visualizations (e.g., pivot tables or charts) based on the data. For example, the smart selection engine 108 determines the spreadsheet operations that may be applicable to a range of data in the spreadsheet based the contextual analysis and displays the suggested operations on the user interface. As an example of editing an existing formula or visualization, editing a function or visualization may involve selecting a different type of chart or visualization (i.e., changing from a line to bar chart), a different range as the input (changing to a different column), or the size of the current series or range (changing from a series of the first 20 values in a range to the first 100 values or the end of the range).

The manner in which the suggestions are displayed in the user interface may depend upon the type of suggestion. For example, viable spreadsheet operations (e.g., formulas or functions) may be displayed as buttons in a guided input area. The operations may be unordered or listed in an order intended to be most efficient for the user. For example, the operations may be shown with the highest probability or most common operations or the operations most frequently chosen by the user listed first. In another example, if the user formats one cell in a range (e.g., types in a currency symbol, types a date in recognized format, or applies actual formatting to a cell), the smart selection engine 108 may automatically select the other cells in the range and present the user with an opportunity to commit the formatting to the entire range. This may be accomplished by displaying a question to the user (e.g., "Do you want to apply currency formatting to this range?") and appropriate response buttons (e.g., "Yes" and "No") in the guided input area. If more suggested operations exist than can be displayed in the guided input area, the smart selection engine 108 may display pagination or continuation controls (e.g., "next" or "back" buttons) to allow the user to see more suggested options. In some embodiments, the smart selection engine 108 may present the user with available operations that do not readily appear to apply to the spreadsheet. If the user selects such an "un-suggested" operation, the smart selection engine 108 may suggest changes to the spreadsheet that would make the data usable with the "un-suggested" operation.

The contextual analysis performed by the smart selection engine 108 may be based on different types of content including, but not limited to, individual cells, ranges, arrays, cell values, formulas, conditions, online analytical processing (OLAP) data, web services, remote databases, and data in other spreadsheets or devices. The content used to generate a suggestion may be visible on the user interface (e.g., a range of cells) or not (e.g., underlying formulas, array functions, or logical conditions). The following examples of contextual analysis and its use are intended to illustrate a variety of some of the types and uses of contextual analysis that may be performed by the smart selection engine 108 and are not intended to be limiting in any fashion.

Contextual analysis of the data may involve detecting the layout of the data. The smart selection engine 108 may detect uniformly structured ranges of cells containing data as a group. For example, the smart selection engine 108 detects all data appearing in a row or a column as part of a group. The smart selection engine 108 may also group all data appearing in contiguous cells (including occasional blank cells with the range). For example, a block or range of data spanning multiple rows and columns may be grouped. Contiguous ranges of data separated by a blank row or column may be detected as separate groups or subgroups of an encompassing group.

Contextual analysis of the data may also involve detecting the content when grouping the data. Based on contextual analysis, different types of data may be grouped separately. The smart selection engine 108 may place text, dates, and numbers in different groups. A contiguous range of numbers with text appearing above or to either side may be treated as a range of numbers with row or column labels. The smart selection engine 108 may place the range of numbers into a single group without the labels for purposes of determining the potential operations. Content may also be used to identify high probability operations. For example, when the smart selection engine 108 detects a cell containing the names of or synonyms or abbreviations for functions or (e.g., "total", "ttl", "sub-total", "sum", "avg.", "minimum", or "max"), the corresponding function may be included in and/or promoted to the top of the list operations. Content may also assist with linking different groups. For example, groups each containing a column of data having the same column label may be related causing the smart selection engine 108 to suggest more complex operations such as conditional functions or lookup functions.

Next, the smart selection engine 108 receives an input 206 indicating which suggested operation the user wants to apply. Once a spreadsheet operation has been selected, the smart selection engine 108 displays the viable results 208 of the operation in the spreadsheet but does not make any actual changes to the spreadsheet (i.e., "ghosting" the results). For many types of operations, the smart selection engine 108 may suggest a range for use in a formula or function. In various embodiments, the smart selection engine 108 highlights one or more objects or ranges in the user interface. In some embodiments, the smart selection engine 108 preselects one or more highlighted objects or ranges so the user can commit the results to the spreadsheet. In some embodiments, the smart selection engine 108 also color codes or labels one or more of the highlighted objects or ranges for easy identification and reference. The smart selection engine 108 may provide alternative suggestions for the operation. For example, smart selection engine 108 may suggest multiple viable ranges within the same sheet or multiple ways to create a chart or table using the same range of data.

In various embodiments, the smart selection engine 108 makes range suggestions based on the type of input expected for the selected operation. In other words, if the selected operation expects a certain type of input, the smart selection engine 108 highlights cells, ranges, or objects matching the expected input type (e.g., strings, numbers, dates, times, hyperlinks, or true/false). For example, if the user selects an operation expecting an array as an input, the smart selection engine 108 will highlight all the data ranges, tables, or other arrays on the sheet, including single cells containing an array formula. The smart selection engine 108 may also highlight ranges based on cell or data formatting, including conditional formatting (date formatting, currency formatting, negative values, values greater than/less than/equal to/not equal to a condition).

In the case of a simple spreadsheet function, the smart selection engine 108 may display suggested results as highlighted results of the formula for the selected operation applied to various ranges of data in the spreadsheet as selectable objects positioned at places around the data that make sense for consideration by the user. For example, the result of a spreadsheet operation on a column of data may be associated with a cell below the last item of the column, the result of a spreadsheet operation on a row of data may be associated with a cell to the right of the last item of row, and the result of a spreadsheet operation on a range of columns and rows may be may be associated with a cell below and to the right of the range of data.

Subsequently, the smart selection engine 108 receives an input 210 indicating which result the user wants to keep and commit to the spreadsheet. In response, the smart selection engine 108 commits the selected result 212 into the selected cell of the spreadsheet 106. For example, in the case of the simple spreadsheet function, the smart selection engine 108 automatically transcribes the address(es) of the range corresponding to the selected result directly into the function. In the various embodiments, the smart selection engine 108 commits the suggested formula to the selected cell and displays the result in the selected cell. In some embodiments, the smart selection engine 108 may only commit the value of the formula to the selected cell rather than actually inserting a formula. In some embodiments, the guided input area includes controls (e.g., a checkbox) allowing the user to choose whether the smart selection engine 108 inserts the formula or the value.

In the case of a complex spreadsheet function or a user initiated action where additional user input is desired (or necessary), the guided input area may be replaced with additional information, selection controls, and/or fields to assist the user with completing the operation. In various embodiments, the smart selection engine 108 determines the likely candidates for the parameters based on the contextual analysis of the data in the spreadsheet. The suggested objects for use as a parameter value in the complex function are highlighted 214 in the spreadsheet, but not committed into the formula. The smart selection engine 108 may color code one or more of the highlighted objects or ranges and one or more inputs of a multi-parameter operation to provide a link between each highlighted object or range and input for which the highlighted object or range is being suggested. As with the simple function, the smart selection engine receives an input 216 selecting a suggested range as the appropriate value for the complex function parameter. The suggested range is then committed 218 as the value for the complex formula parameter. Once all required parameters for the complex function have been supplied and the smart selection engine receives an input finalizing the complex function parameter entry 220, the smart selection engine commits 222 the completed complex function to the spreadsheet 300.

Figure 3:
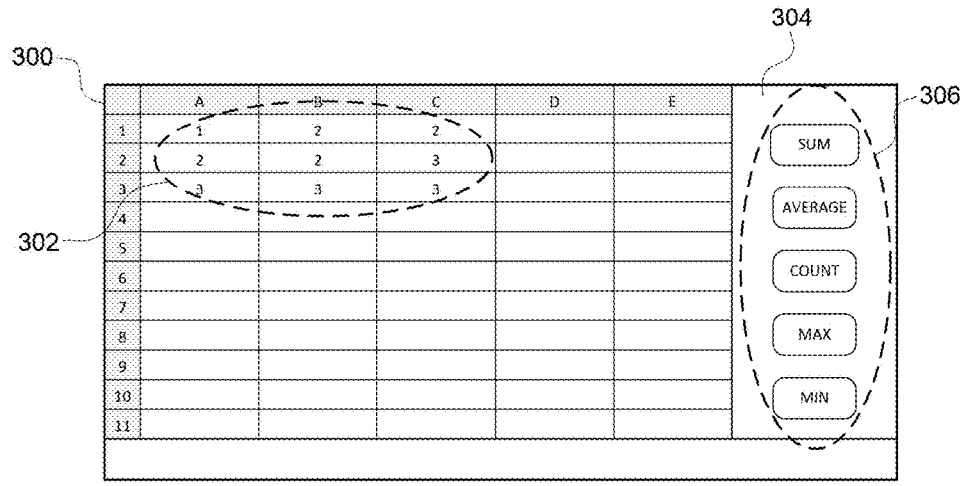
FIGS. 3-6 illustrate one embodiment of the smart selection engine working with a simple function.

FIGS. 3-6 illustrate one application of the smart selection method to a simple spreadsheet operation. FIG. 3 illustrates a spreadsheet 300 containing a range of numbers 302 arranged in a contiguous block of rows and columns. The smart selection engine 108 has analyzed the layout and content of the group of numbers and selected a set of suggested operations applicable to the group of numbers 302. The smart selection engine 108 displays the operations in a guided input area 304. The guided input area contains a group of buttons 306. Each button is linked to an operation from the set of operations.

Figure 4:
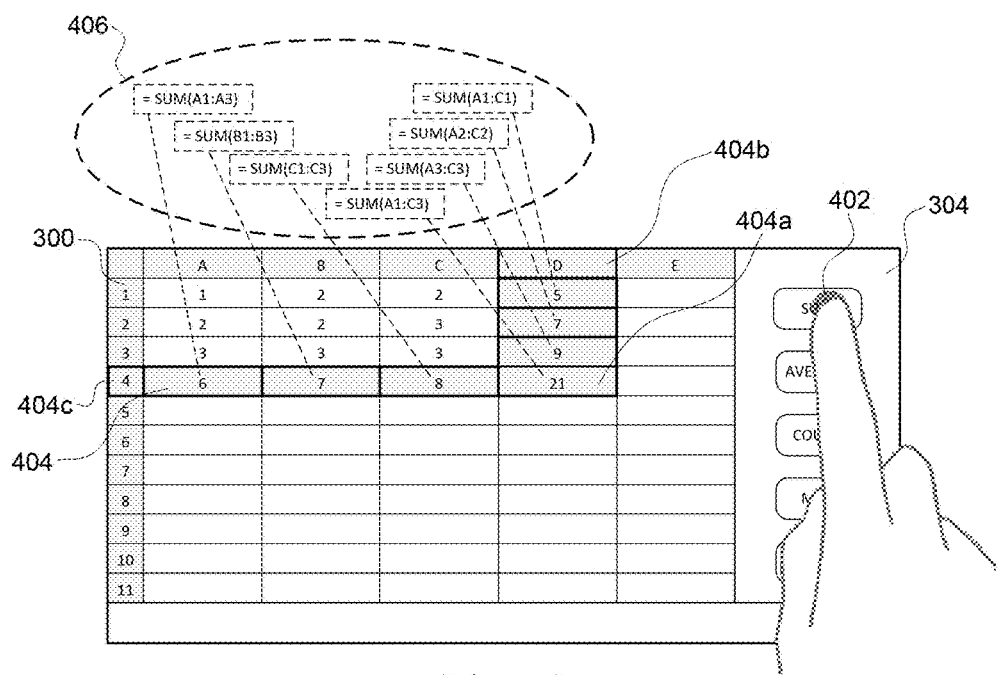

FIG. 4 shows the smart selection engine 108 accepting an input for selecting one of the operations and suggesting results of the selected operation. In the illustrated embodiment, the user selects the SUM operation 402 by touching the appropriate button in the guided input area 304. Although illustrated as pressing a touch screen, the smart selection engine 108 may accept inputs using other natural user interface gestures and using other input devices, including but not limited to voice recognition devices, mice, trackballs, and keyboards. The smart selection engine 108 responds by ghosting in results 404 for the selected operation. The ghosted results represent the values of suggested formulas 406 for the entire range 404a and the individual rows 404b and columns 404c in the range. The suggested formulas 406 are not committed to the spreadsheet at this time. Generally, the suggested formulas 406 are not displayed to the user, but are illustrated here to show the operation of the smart selection engine 108 behind the scenes. In some embodiments, it may be desirable to show the suggested formula to the user and the suggested formulas may be displayed as annotations or otherwise ghosted over the spreadsheet.

Figure 5:
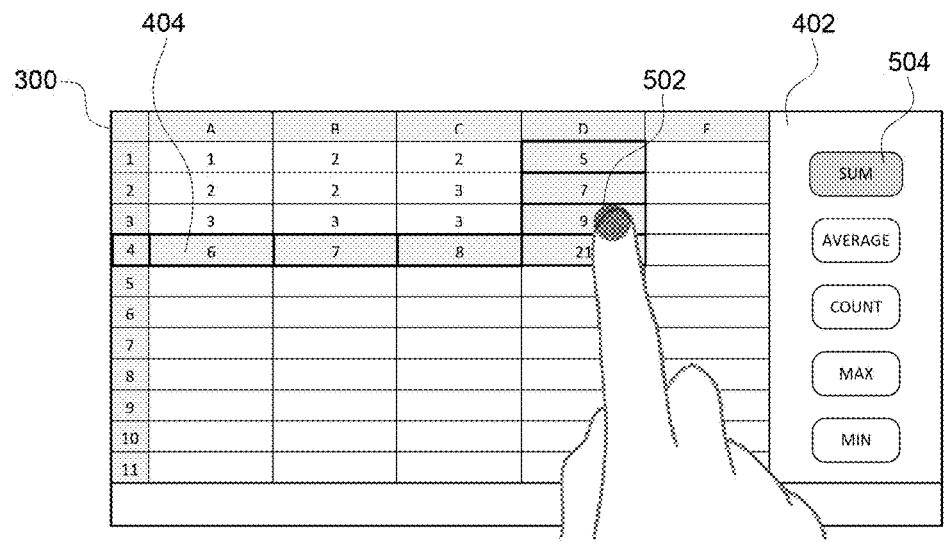

FIG. 5 shows the smart selection engine 108 accepting an input for selecting one of the suggested results. In the illustrated embodiment, the user selects the cell 502 containing the desired result, which represents the sum of Row 3 (and, more specifically) the sum of Cells A3, B3, and C3. In various embodiments, the selected operation control 504 is highlighted in the guided input area to provide the user with a visual indication of which operation the suggested results 404 are associated with.

Figure 6:
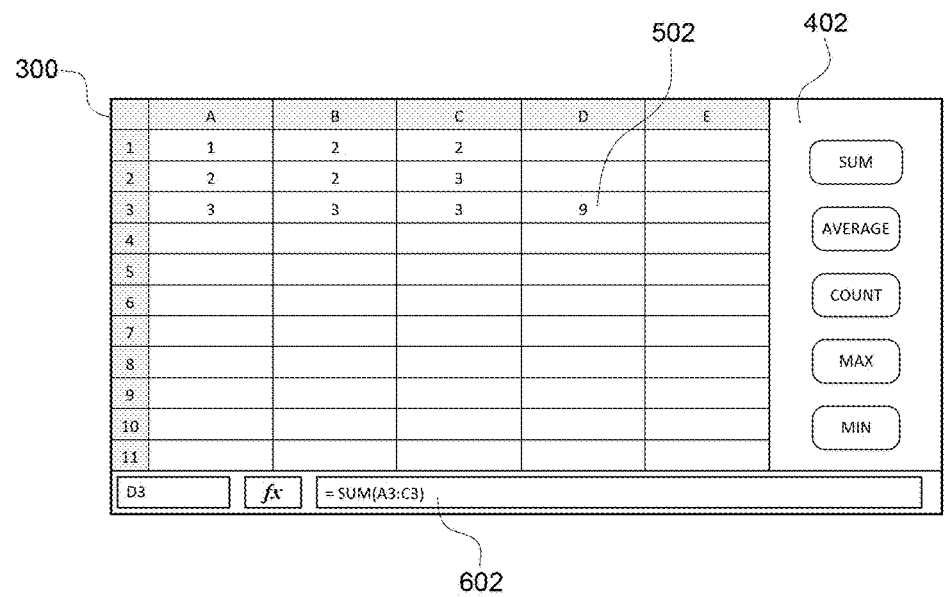

FIG. 6 shows the smart selection engine 108 inserting the selected result into the spreadsheet. The smart selection engine 108 inserts the selected result into the spreadsheet by committing the formula or value into the selected cell, removes the ghosted results that were not selected from the spreadsheet, and un-highlights the selected operation control. In the illustrated embodiment, the smart selection engine 108 commits the formula to the cell and optionally displays the formula 602 in the formula bar to show the user that the formula associated with the selected cell. In this example, the user is able to apply a suggested operation to a selected range in two actions (i.e., taps/clicks/etc.).

It should be noted that the efficiency provided by the smart selection engine 108 reduces or eliminates the need to perform cut and paste operations to copy formulas between cells. Although some spreadsheet applications attempt to update copied formulas based on the relative position of the source cell and destination cell, such formula updates are not without the potential for error. For example, a formula may have a fixed range (e.g., $A1:$A3) that cannot be automatically updated by the spreadsheet application 104. Because the formulas supplied by the smart selection engine 108 are specific to each cell, the likelihood of mistakes resulting from formulas that do not properly update is reduced.

Figures 7, 8:
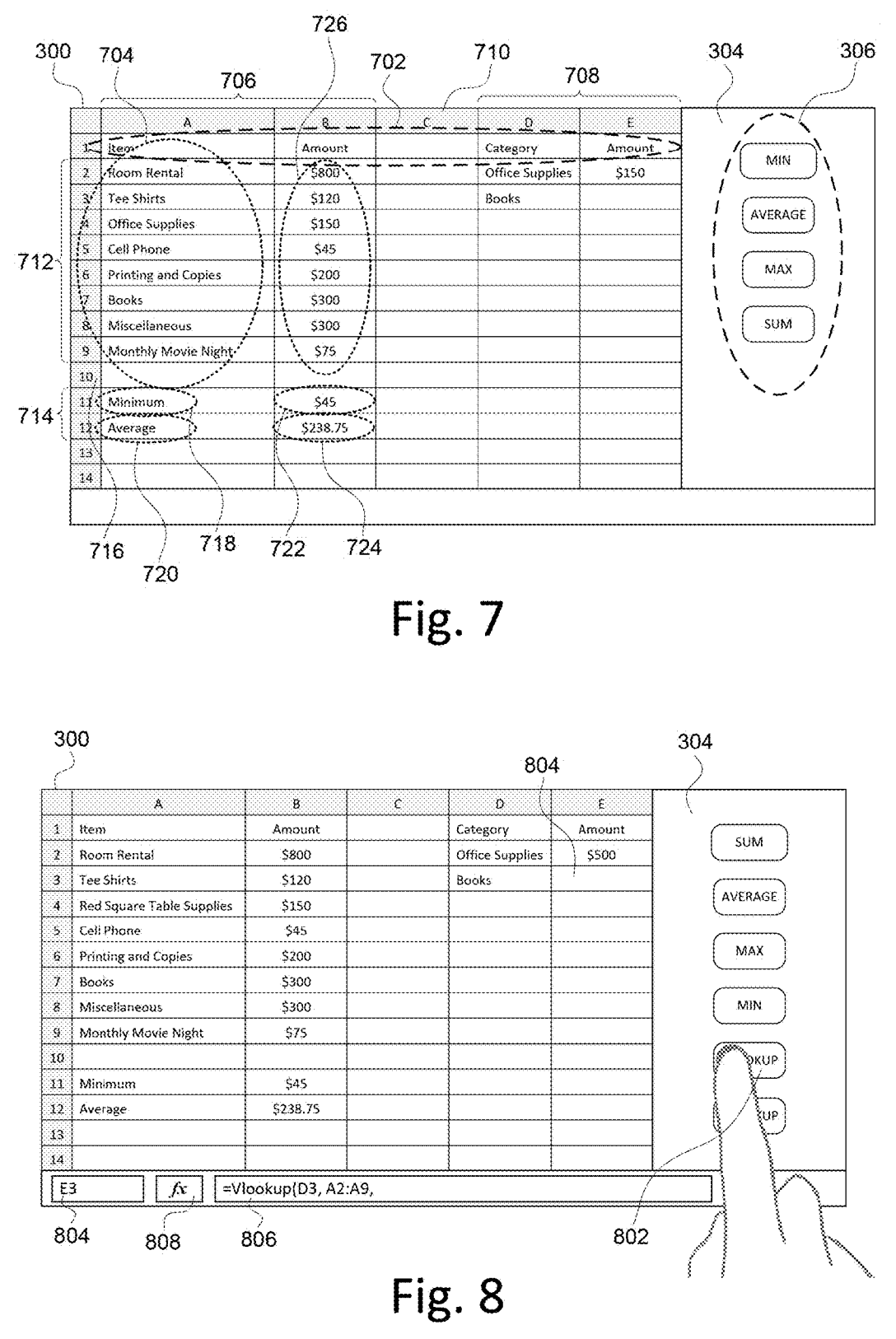

FIG. 7 is another version of the spreadsheet 300 providing examples of some of the contextual analysis that may be performed by the smart selection engine 108. The smart selection engine 108 detects a row of text appearing above ranges containing text and numbers as pa header row containing column labels 702. Similarly, the smart selection engine 108 detects the column of text appearing to the left of the series of numbers as a header row containing row labels 704. Here, the smart selection engine 108 treats the content of columns A and B and the content of columns D and E as two separate ranges 706, 708 due to the blank column 710 between them. Similarly, the smart selection engine 108 may treat the content 712 of rows 2-9 and the content 714 of rows 11 and 12 as two separate ranges due to the blank row 716 between them.

The guided input area 304 includes some suggested operations 306 based on the contextual analysis of the spreadsheet 300 thus far. Based on the appearance of the labels 718, 720 corresponding to recognizable spreadsheet functions, the smart selection engine 108 includes and highly ranks the corresponding operations in the suggested operations 306 shown in the guided input area 304 allowing the user to quickly insert the corresponding formulas using the content in an manner similar to that described in relation to FIGS. 3-6 in the viable cells 722, 724 appearing under the viable range 726 for the formulas.

FIGS. 8-11 illustrate one application of the smart selection method to a complex spreadsheet operation. FIG. 8 illustrates the smart selection engine 108 accepting an input for selecting one of the suggested operations. In the illustrated embodiment, the user selects the VLOOKUP operation 802 by touching the appropriate button in the guided input area 304. The selected operation is applied to the target cell 804. Alternatively, the user may type a function 806 into the formula bar to cause the smart selection engine 108 to suggest viable parameters and/or results corresponding to the selected function. The smart selection engine 108 may use autocomplete or tabbing through available functions to reduce the amount of typing required. In other embodiments, the user may select a function from a list of functions displayed by accessing the function list using a function button 808 in the formula bar to cause the smart selection engine 108 to suggest viable parameters and/or results corresponding to the selected function.

Figure 9:
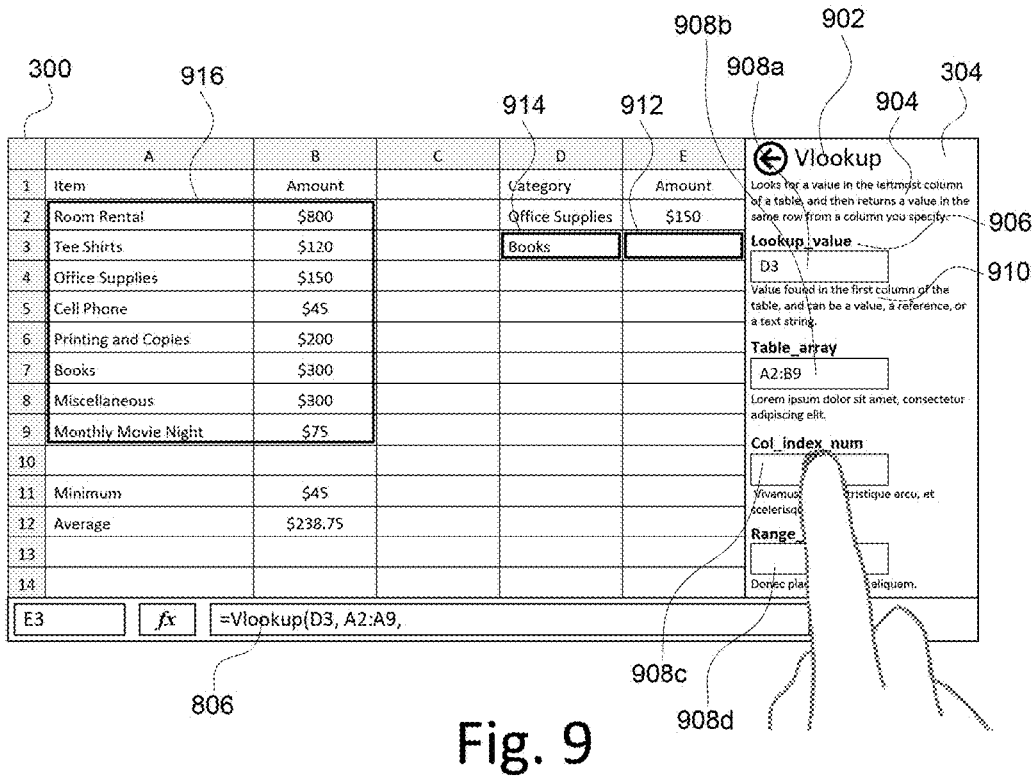

FIG. 9 illustrates the smart selection engine 108 accepting an input for selecting a parameter field for a complex (i.e., multi-parameter) function. The smart selection populates the guided input area 304 with information about the selected function such as the function name 902, a brief description of the selected function 904, labels 906 for the parameters (i.e., arguments) of the selected function, fields 908a-d corresponding to parameters of the selected function, and brief descriptions 910 of the parameters to the selected function. In the illustrated embodiment, the lookup value field 908a and the table array field 908b have already been populated by the user and/or the smart selection engine 108 with a selected cell 912 and an array 914, respectively. In various embodiments, the smart selection engine 108 predicts and pre-fills suggested parameters of the function when possible. For example, the smart selection engine 108 may identify the cell 914, such as the cell next to the target cell

804, as the source of the lookup value and populate the lookup value field 908*a* accordingly. Because the VLOOKUP function expects an array for the second parameter, the smart selection engine 108 may identify arrays in the spreadsheet and may pre-fill the table array field with a viable array such as the array 916. As previously mentioned, some embodiments of the smart selection engine 108 may detect that the lookup value contains a string and limit the viable options for the table arrays to those arrays containing at least one range of string values. If the smart selection engine 108 cannot predict a value for one or more of the parameter fields or the user selects a field that has already been populated (i.e., edits the field), the smart selection engine 108 will analyze the spreadsheet and highlight viable objects (e.g., cells, ranges, or arrays) that might supply the value for the field. The user may then select (e.g., touch) the object the user wishes to supply the value for the field and the smart selection engine 108 automatically updates the value of the field. The field values are also inserted into the appropriate locations in the function in the formula bar.

Figure 10:
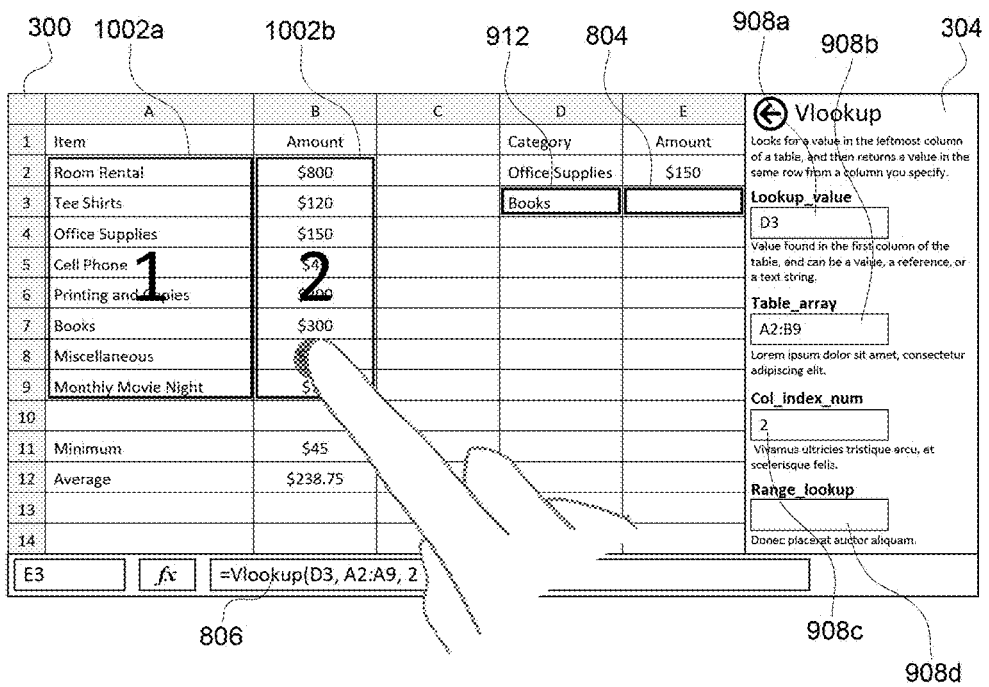

FIG. 10 illustrates the smart selection engine 108 offering suggested ranges to populate the field for the third parameter to the VLOOKUP function. The third parameter is the column index that supplies the result value when the lookup value matches a value from the leftmost column of the table array. In the illustrated embodiment, the array 916 contains two columns. The smart selection engine highlights and labels each viable column with the corresponding column number to provide the user with two interactive areas 1002*a*, 1002*b* that the user may interact with to quickly and easily select the column used to supply the result value for the VLOOKUP function. In the illustrated embodiment, the user selects the second area 1002*b* (i.e., the second column in the table array). In response, the smart selection engine 108 populates the column index field 908*c* and updates the function 806 in the formula bar. In various embodiments, the smart selection engine 108 deactivates and "greys out" portions of the spreadsheet that are not viable responses until an appropriate selection has been made.

Figure 11:
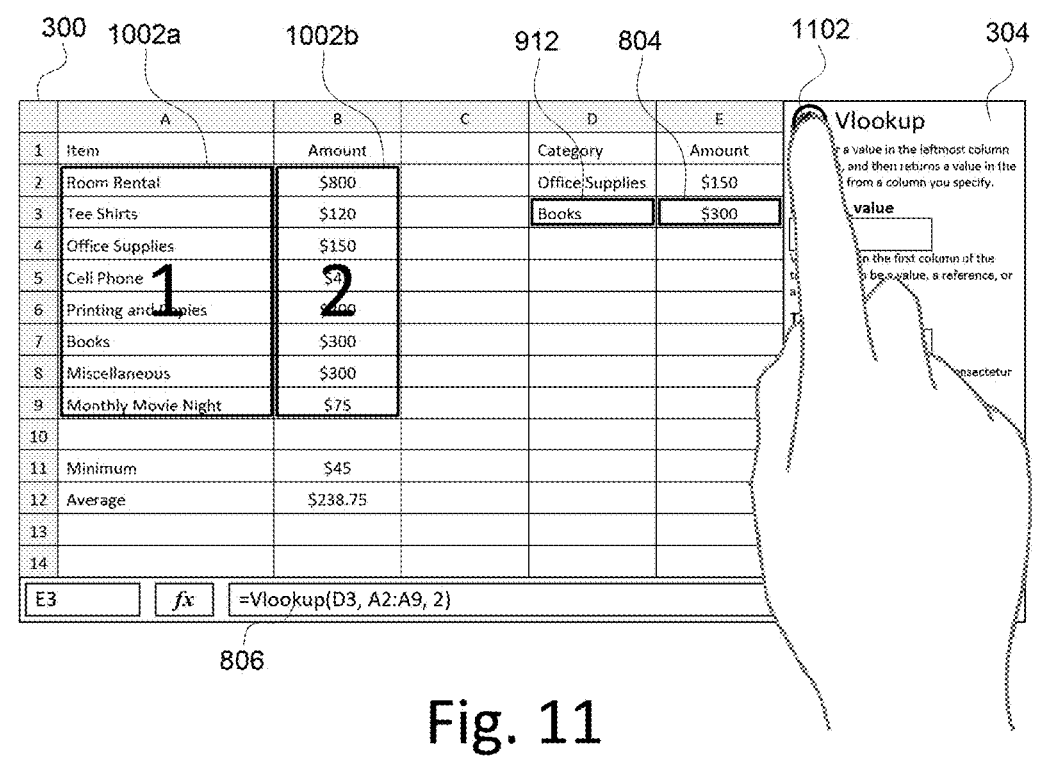

FIG. 11 illustrates the smart selection engine 108 accepting a parameter finalizing the complex function entry. The smart selection engine 108 allows the user to touch an icon 1102 such as back arrow, a checkmark, or an OK button to finalize the complex function entry. This allows the user to stop the guided entry function of the smart selection engine 108. If all required parameters have been supplied, the smart selection engine 108 commits the complex formula to the target cell 804 in the spreadsheet 300. In various embodiments, if some of the required parameters of the complex function have not been entered, the complex function is discarded and not committed into the target cell 804 of the spreadsheet 300. In other embodiments, the user is notified that the complex formula is incomplete and given the opportunity to complete the complex formula.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 12:
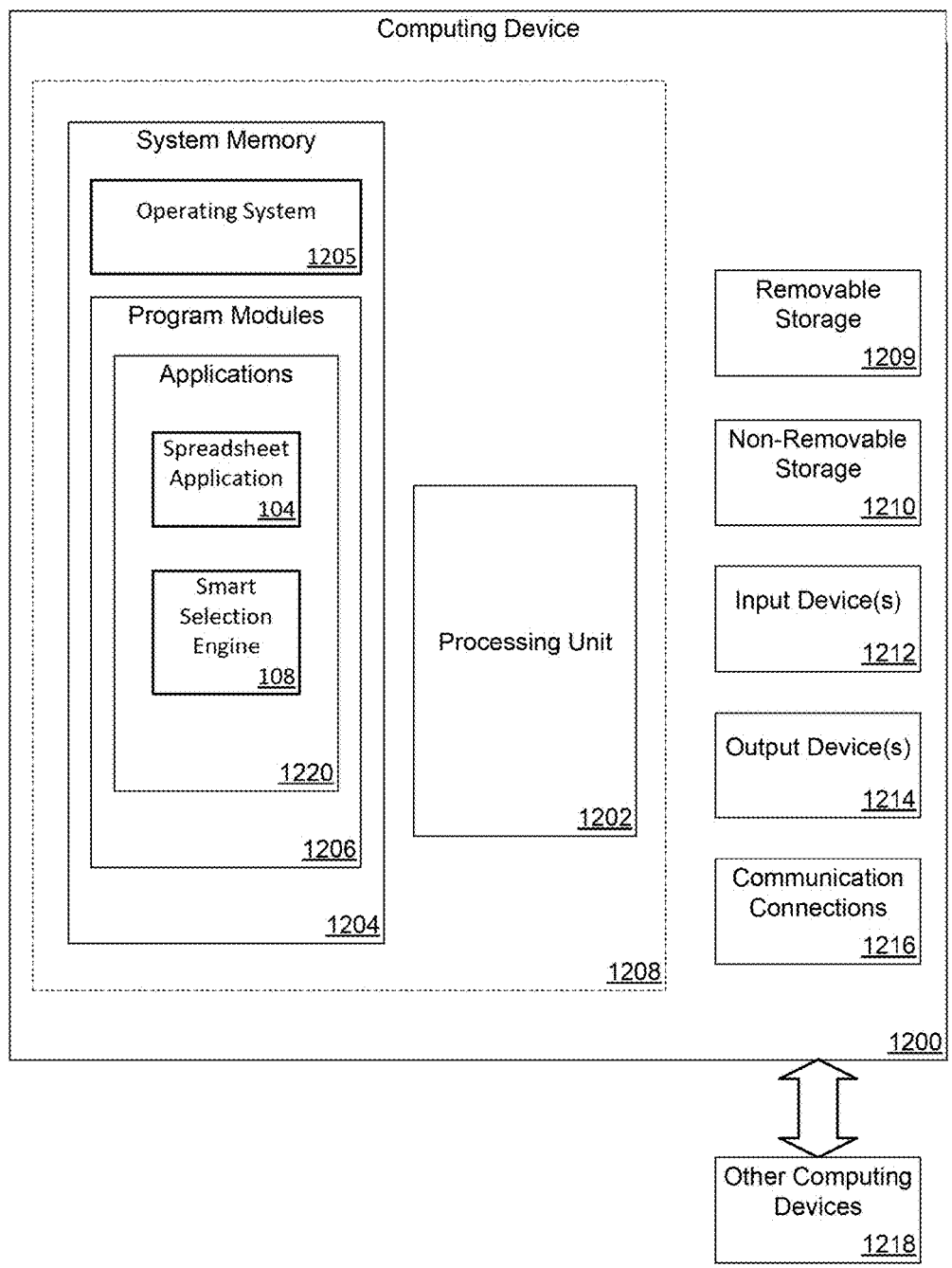
FIG. 12 is a block diagram illustrating one embodiment of the physical components of a computing device with which embodiments of the invention may be practiced.
Figure 13A:
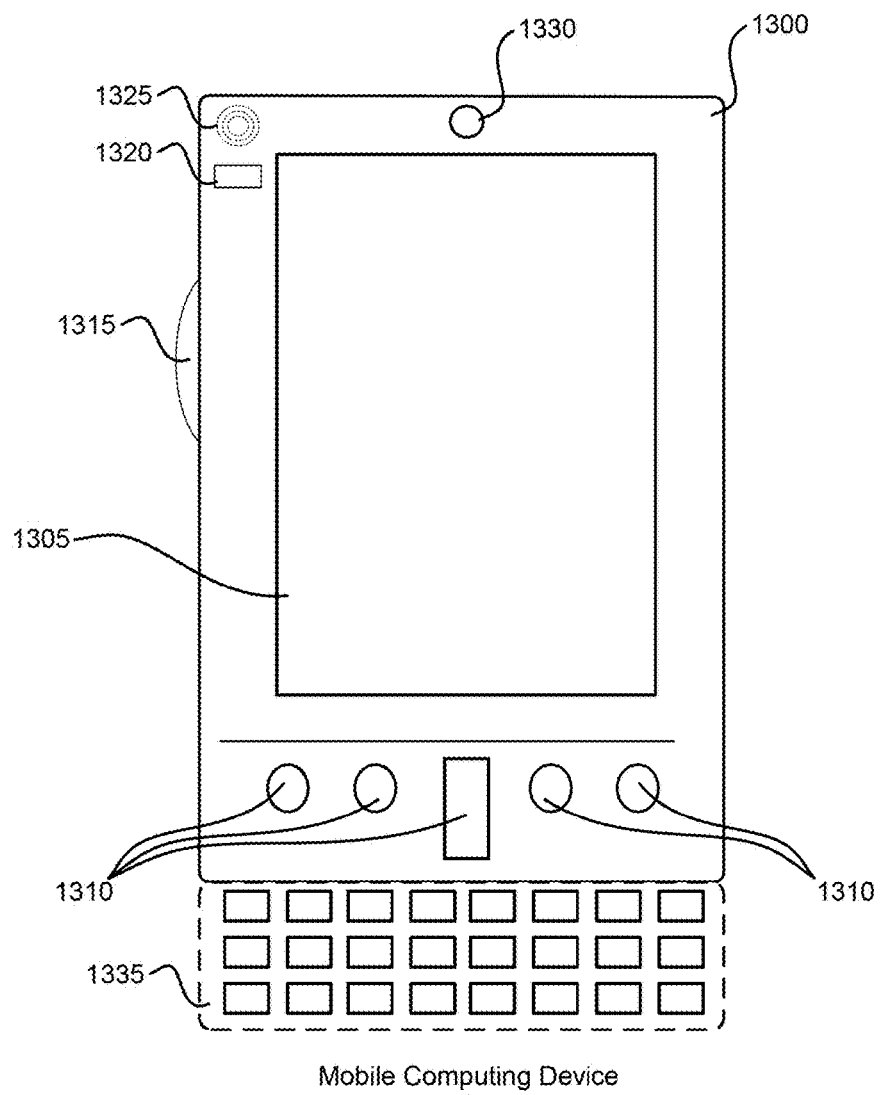
FIGS. 13A and 13B are simplified block diagrams of a mobile computing device with which embodiments of the present invention may be practiced.
Figure 13B:
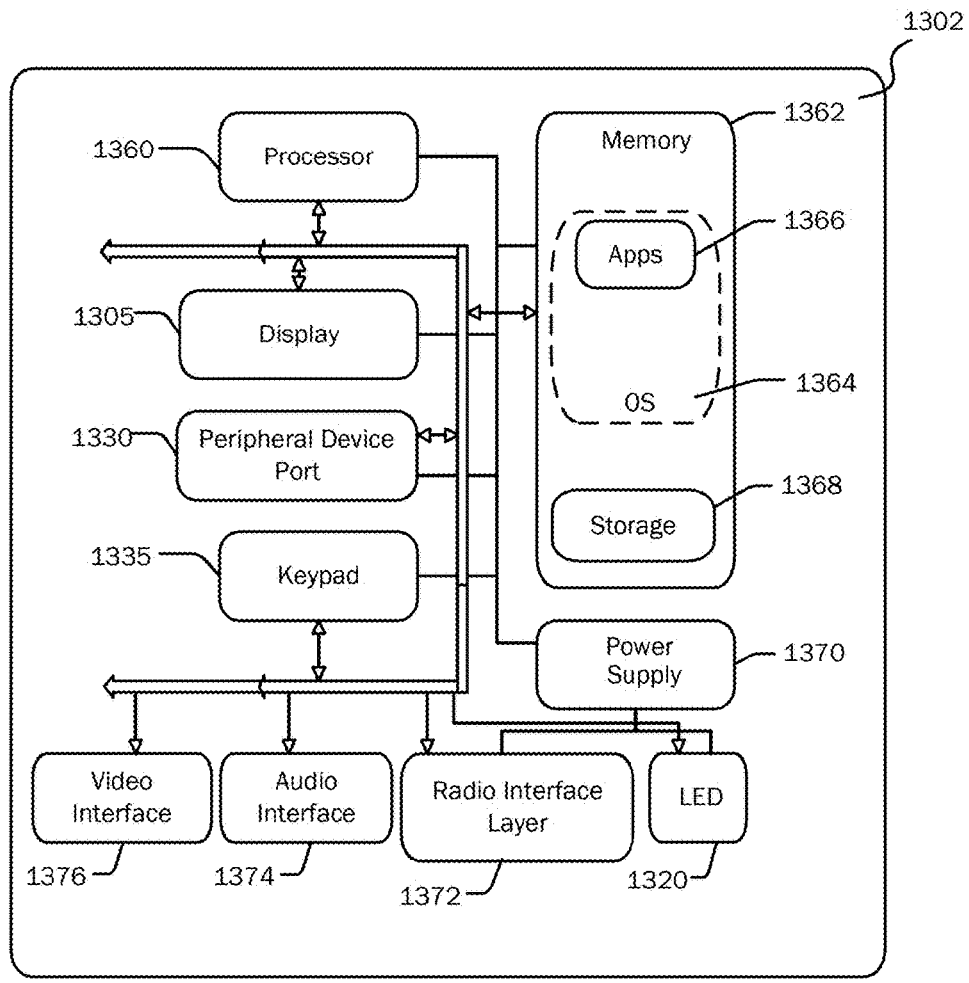
Figure 14:
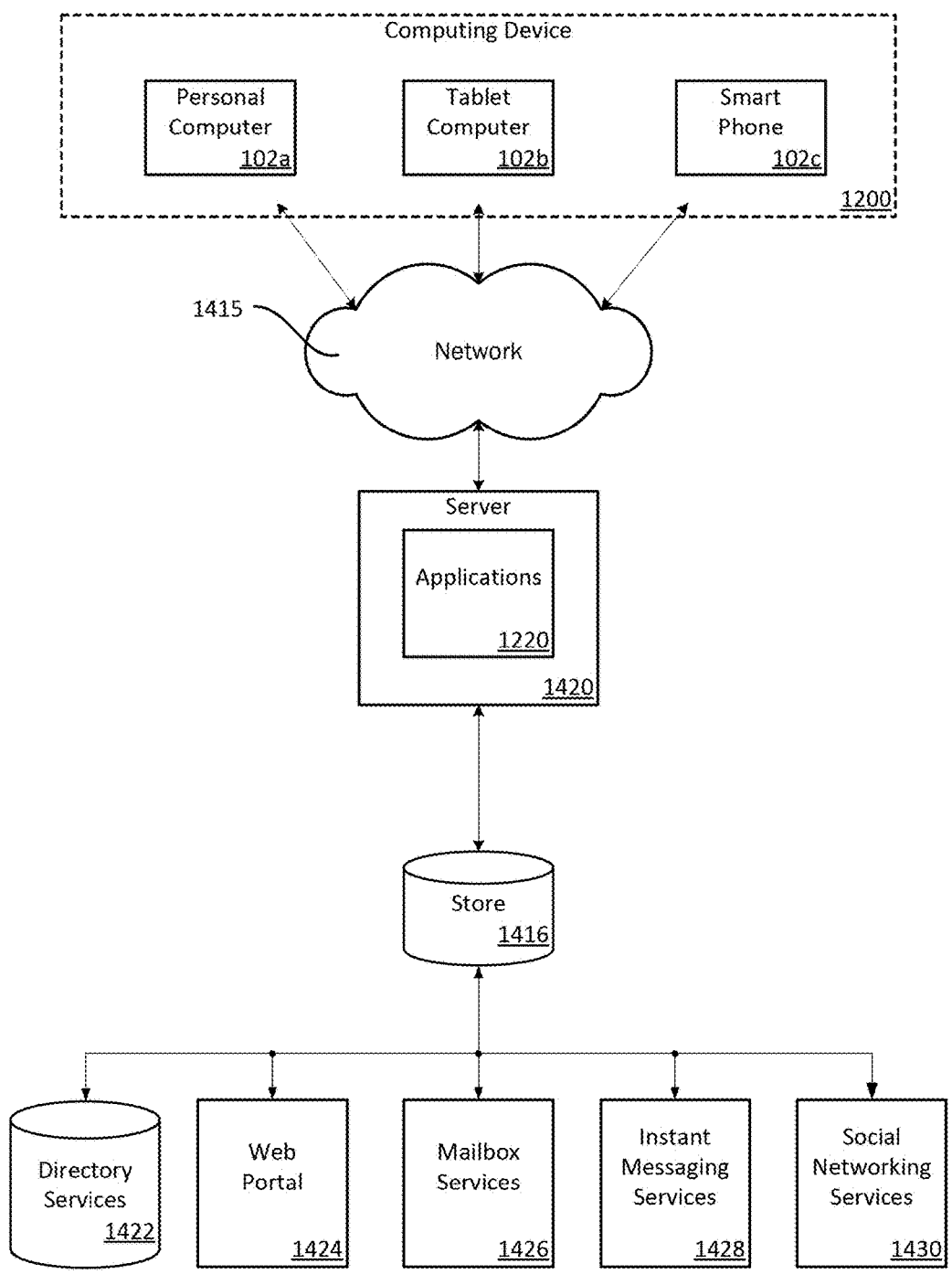
FIG. 14 is a simplified block diagram of a distributed computing system in which embodiments of the present invention may be practiced.

FIGS. 12-14 and the associated descriptions provide a discussion of a variety of operating environments in which embodiments of the invention may be practiced. However, the devices and systems illustrated and discussed with respect to FIGS. 12-14 are for purposes of example and illustration and are not limiting of a vast number of computing device configurations that may be utilized for practicing embodiments of the invention, described herein.

FIG. 12 is a block diagram illustrating physical components (i.e., hardware) of a computing device 1200 with which embodiments of the invention may be practiced. The computing device components described below may be suitable for the computing devices described above including the personal computer 102*a*, the tablet computer 102*b*, and the smart phone 102*c*. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories. The system memory 1204 may include an operating system 1205 and one or more program modules 1206 suitable for running software applications 1220 such as the spreadsheet application 104 and the smart selection engine 108. The operating system 1205, for example, may be suitable for controlling the operation of the computing device 1200. Furthermore, embodiments of the invention may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the software applications 1220 may perform processes including, but not limited to, one or more of the stages of the smart selection method 200 illustrated in FIG. 2. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the software applications 1220 may be operated via application-specific logic integrated with other components of the computing device 1200 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1200 may also have one or more input device(s) 1212 such as a keyboard, a mouse, a pen, a sound input device, a touch input device, etc. The output device(s) 1214 such as a display, speakers, a printer, etc. may also be included. The aforementioned devices are examples and others may be used. The computing device 1200 may include one or more communication connections 1216 allowing communications with other computing devices 1218. Examples of suitable communication connections 1216 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules . . . . The system memory 1204, the removable storage device 1209, and the non-removable storage device 1210 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200.

FIGS. 13A and 13B illustrate a mobile computing device 1300, for example, a mobile telephone, a smart phone, a tablet personal computer, a laptop computer, and the like, with which embodiments of the invention may be practiced. With reference to FIG. 13A, one embodiment of a mobile computing device 1300 for implementing the embodiments is illustrated. In a basic configuration, the mobile computing device 1300 is a handheld computer having both input elements and output elements. The mobile computing device 1300 typically includes a display 1305 and one or more input buttons 1310 that allow the user to enter information into the mobile computing device 1300. The display 1305 of the mobile computing device 1300 may also function as an input device (e.g., a touch screen display). If included, an optional side input element 1315 allows further user input. The side input element 1315 may be a rotary switch, a button, or any other type of manual input element. In alternative embodiments, mobile computing device 1300 may incorporate more or less input elements. For example, the display 1305 may not be a touch screen in some embodiments. In yet another alternative embodiment, the mobile computing device 1300 is a portable phone system, such as a cellular phone. The mobile computing device 1300 may also include an optional keypad 1335. Optional keypad 1335 may be a physical keypad or a "soft" keypad generated on the touch screen display. In various embodiments, the output elements include the display 1305 for showing a graphical user interface (GUI), a visual indicator 1320 (e.g., a light emitting diode), and/or an audio transducer 1325 (e.g., a speaker). In some embodiments, the mobile computing device 1300 incorporates a vibration transducer for providing the user with tactile feedback. In yet another embodiment, the mobile computing device 1300 incorporates input and/or output ports, such as an audio input (e.g., a microphone jack), an audio output (e.g., a headphone jack), and a video output (e.g., a HDMI port) for sending signals to or receiving signals from an external device.

FIG. 13B is a block diagram illustrating the architecture of one embodiment of a mobile computing device. That is, the mobile computing device 1300 can incorporate a system (i.e., an architecture) 1302 to implement some embodiments. In one embodiment, the system 1302 is implemented as a "smart phone" capable of running one or more applications (e.g., browser, e-mail, calendaring, contact managers, messaging clients, games, and media clients/players). In some embodiments, the system 1302 is integrated as a computing device, such as an integrated personal digital assistant (PDA) and wireless phone.

One or more application programs 1366 may be loaded into the memory 1362 and run on or in association with the operating system 1364. Examples of the application programs include phone dialer programs, e-mail programs, personal information management (PIM) programs, word processing programs, spreadsheet programs, Internet browser programs, messaging programs, and so forth. The system 1302 also includes a non-volatile storage area 1368 within the memory 1362. The non-volatile storage area 1368 may be used to store persistent information that should not be lost if the system 1302 is powered down. The application programs 1366 may use and store information in the non-volatile storage area 1368, such as e-mail or other messages used by an e-mail application, and the like. A synchronization application (not shown) also resides on the system 1302 and is programmed to interact with a corresponding synchronization application resident on a host computer to keep the information stored in the non-volatile storage area 1368 synchronized with corresponding information stored at the host computer. As should be appreciated, other applications may be loaded into the memory 1362 and run on the mobile computing device 1300, including software applications 1220 described herein.

The system 1302 has a power supply 1370, which may be implemented as one or more batteries. The power supply 1370 might further include an external power source, such as an AC adapter or a powered docking cradle that supplements or recharges the batteries.

The system 1302 may also include a radio 1372 that performs the function of transmitting and receiving radio frequency communications. The radio 1372 facilitates wireless connectivity between the system 1302 and the "outside world," via a communications carrier or service provider. Transmissions to and from the radio 1372 are conducted under control of the operating system 1364. In other words, communications received by the radio 1372 may be disseminated to the application programs 1366 via the operating system 1364, and vice versa.

The visual indicator 1320 may be used to provide visual notifications, and/or an audio interface 1374 may be used for producing audible notifications via the audio transducer 1325. In the illustrated embodiment, the visual indicator 1320 is a light emitting diode (LED) and the audio transducer 1325 is a speaker. These devices may be directly coupled to the power supply 1370 so that when activated, they remain on for a duration dictated by the notification mechanism even though the processor 1360 and other components might shut down for conserving battery power. The LED may be programmed to remain on indefinitely until the user takes action to indicate the powered-on status of the device. The audio interface 1374 is used to provide audible signals to and receive audible signals from the user. For example, in addition to being coupled to the audio transducer 1325, the audio interface 1374 may also be coupled to a microphone to receive audible input, such as to facilitate a telephone conversation. In accordance with embodiments of the present invention, the microphone may also serve as an audio sensor to facilitate control of notifications, as will be described below. The system 1302 may further include a video interface 1376 that enables an operation of an on-board camera 1330 to record still images, video stream, and the like.

A mobile computing device 1300 implementing the system 1302 may have additional features or functionality. For example, the mobile computing device 1300 may also include additional data storage devices (removable and/or non-removable) such as, magnetic disks, optical disks, or tape. Such additional storage is illustrated in FIG. 13B by the non-volatile storage area 1368.

Data/information generated or captured by the mobile computing device 1300 and stored via the system 1302 may be stored locally on the mobile computing device 1300, as described above, or the data may be stored on any number of storage media that may be accessed by the device via the radio 1372 or via a wired connection between the mobile computing device 1300 and a separate computing device associated with the mobile computing device 1300, for example, a server computer in a distributed computing network, such as the Internet. As should be appreciated such data/information may be accessed via the mobile computing device 1300 via the radio 1372 or via a distributed computing network. Similarly, such data/information may be readily transferred between computing devices for storage and use according to well-known data/information transfer and storage means, including electronic mail and collaborative data/information sharing systems.

FIG. 14 illustrates one embodiment of the architecture of a system for providing smart selection functionality to one or more client devices, as described above. Content developed, interacted with, or edited in association with the software applications 1220 may be stored in different communication channels or other storage types. For example, various documents may be stored using a directory service 1422, a web portal 1424, a mailbox service 1426, an instant messaging store 1428, or a social networking site 1430. The software applications 1220 may use any of these types of systems or the like for enabling data utilization, as described herein. A server 1420 may provide the software applications 1220 to clients. As one example, the server 1420 may be a web server providing the software applications 1220 over the web. The server 1420 may provide the software applications 1220 over the web to clients through a network 1415. By way of example, the client computing device may be implemented as the computing device 1200 and embodied in a personal computer 102a, a tablet computer 102b, and/or a mobile computing device 102c (e.g., a smart phone). Any of these embodiments of the client computing device 102a-c may obtain content from the store 1416.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for performing operations in a spreadsheet having a user interface and containing data, the method comprising:
   automatically and contextually adjusting the user interface to display an interactive element in the spreadsheet that allows an operation to be directly performed by interacting with the interactive element,
   wherein automatically and contextually adjusting the user interface to display an interactive element in the spreadsheet that allows an operation to be directly performed by interacting with the interactive element comprises:
   detecting content of a range of the data;
   suggesting a set of one or more operations applicable to the range of data based on a layout and the content; and
   displaying a viable result for the operation as the interactive element.

2. The method of claim 1, wherein automatically and contextually adjusting the user interface to display an interactive element in the spreadsheet that allows an operation to be directly performed by interacting with the interactive element further comprises detecting the layout of the range of data in the spreadsheet.

3. The method of claim 2, wherein automatically and contextually adjusting the user interface to display an interactive element in the spreadsheet that allows an operation to be directly performed by interacting with the interactive element further comprises suggesting a set of operations applicable to the range of data based on the layout.

4. The method of claim 1, further comprising modifying the spreadsheet in accordance with one of the suggestions selected by the user further comprises the act of committing the viable result to the spreadsheet in response to direct interaction with the interactive element.

5. The method of claim 1, wherein automatically and contextually adjusting the user interface to display an interactive element in the spreadsheet that allows an operation to be directly performed by interacting with the interactive element further comprises linking a spreadsheet object viable to complete the operation with the interactive element.

6. The method of claim 1, wherein automatically and contextually adjusting the user interface to display an interactive element in the spreadsheet that allows an operation to be directly performed by interacting with the interactive element further comprises linking content from the spreadsheet having a type matching an expected data type required by the operation with the interactive element.

7. The method of claim 1, wherein automatically and contextually adjusting the user interface to display an interactive element in the spreadsheet that allows an operation to be directly performed by interacting with the interactive element further comprises generating a formula for the operation using a viable range from the spreadsheet.

8. The method of claim 7, wherein modifying the spreadsheet in response to direct interaction with the interactive element further comprises committing the formula into the spreadsheet.

9. The method of claim 1, wherein automatically and contextually adjusting the user interface to display an interactive element in the spreadsheet that allows an operation to be directly performed by interacting with the interactive element further comprises:
displaying a guided input area having an interactive control corresponding to a parameter of function used in a formula;
linking a spreadsheet object suggested to provide a value for the parameter to the interactive element; and
committing the value of the spreadsheet object or a reference to the spreadsheet object into the formula in response to direct interaction with the interactive element.

10. A system comprising a computing device having a processor and a memory in electronic communication with the processor for executing a smart selection engine operable to:
automatically and contextually adjust a user interface to display an interactive element in a spreadsheet that allows an operation to be directly performed by interacting with the interactive element,
wherein automatically and contextually adjusting the user interface to display an interactive element in the spreadsheet that allows an operation to be directly performed by interacting with the interactive element comprises:
detecting content of a range of the data;
suggesting a set of one or more operations applicable to the range of data based on a layout and the content; and
displaying a viable result for the operation as the interactive element.

11. The system of claim 10, wherein the smart selection engine is further operable to detect direct interaction with the interactive selections.

12. The system of claim 10, wherein the smart selection engine is further operable to show viable results corresponding to the selected operation as interactive suggestions without committing the viable results to the spreadsheet.

13. The system of claim 10, wherein the smart selection engine is further operable to link interactive suggestions to viable spreadsheet objects for providing a value for a parameter needed to complete a function without committing the value into the function.

14. The system of claim 13, wherein the smart selection engine is further operable to highlight the viable spreadsheet objects.

15. The system of claim 14, wherein the smart selection engine is further operable to apply labels to a highlighted range to identify the highlighted suggested range when used as a function parameter.

16. A computing device containing computer executable instructions which, when executed by a computer, perform a method for providing a user interface allowing a user to interact directly with the spreadsheet to perform operations comprising a collection of operations, the method comprising:
automatically and contextually adjust a user interface to display an interactive element in a spreadsheet that allows an operation to be directly performed by interacting with the interactive element,
wherein automatically and contextually adjusting the user interface to display an interactive element in the spreadsheet that allows an operation to be directly performed by interacting with the interactive element comprises:
detecting content of a range of the data;
suggesting a set of one or more operations applicable to the range of data based on a layout and the content;
receiving an input selecting an operation from the set of one or more operations;
generating a set of results for a plurality of ranges of the data for the selected operation;
displaying the set of results at corresponding locations of the spreadsheet;
receiving an input selecting at least one result from the set of results; and
committing the selected result into the spreadsheet.

17. The computing device of claim 16, wherein the method further comprises:
performing contextual analysis of the data in the spreadsheet; and
selecting a set of operations applicable to at least part of the data based on the contextual analysis.

* * * * *